(12) United States Patent
Inaba

(10) Patent No.: US 6,713,994 B2
(45) Date of Patent: Mar. 30, 2004

(54) POWER SAVING INTEGRATED CIRCUIT AND METHOD OF CONTROLLING THE SAME

(75) Inventor: Soichiro Inaba, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 17 days.

(21) Appl. No.: 10/112,759

(22) Filed: Apr. 2, 2002

(65) Prior Publication Data
US 2002/0149353 A1 Oct. 17, 2002

(30) Foreign Application Priority Data
Apr. 12, 2001 (JP) ........................................ 2001-113907

(51) Int. Cl.[7] ................ G05F 1/40; H02J 7/02
(52) U.S. Cl. .................................. 323/283; 307/66
(58) Field of Search ................. 323/283, 284, 323/288, 285, 286, 299; 307/66, 64, 65; 358/434, 438, 468

(56) References Cited

U.S. PATENT DOCUMENTS 5,506,878 A  *  4/1996 Chiang ........................ 377/79

FOREIGN PATENT DOCUMENTS

| JP | 01-280818 | 11/1989 |
|----|-----------|---------|
| JP | 08-179857 | 7/1996  |

* cited by examiner

*Primary Examiner*—Rajnikant B. Patel
(74) *Attorney, Agent, or Firm*—Volentine Francos, PLLC

(57) ABSTRACT

An operating condition of an operating circuit is provided to a register, a counter is set in accordance with an operating condition signal stored in the register, and the counter outputs a reset signal to the operating circuit. The operating condition signal indicates a reset delay period which is equal to the sum of a shortest rise time of power supply voltage and a reset period to reset the counter after the power supply voltage has settled.

18 Claims, 6 Drawing Sheets

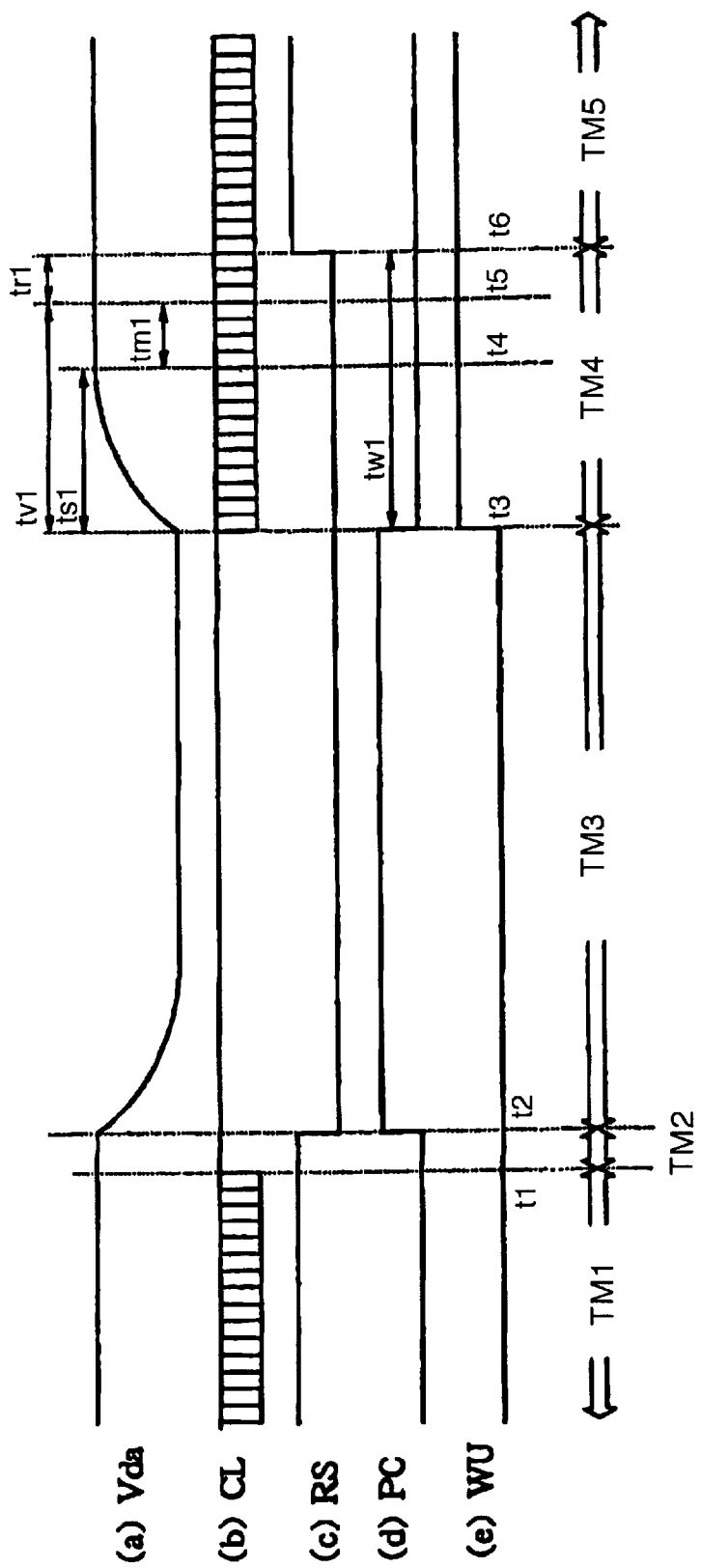

POWER SAVING INTEGRATED CIRCUIT AND METHOD OF CONTROLLING THE SAME

BACKGROUND OF THE INVENTION

1. Field of the Invention

The present invention relates to a power saving integrated circuit having a power saving function and a method of controlling the same, and more particularly to a reduction in power consumption of the integrated circuit The present application claims priority under 35 U.S.C. §119 to Japanese Patent Application No. 2001-113907, filed Apr. 12, 2001, which is herein incorporated by reference in its entirely for all purposes.

2. Description of the Related Art

A conventional integrated circuit is constructed with a plurality of circuit blocks having various uses, each of which includes at least one circuit element, respectively Generally, the conventional integrated circuit includes a power supply circuit which supplies stable power, a switching circuit which switches a supply of a power supply voltage "ON" and "OFF", a power control circuit which controls a switching of the switching circuit, and an operating circuit which receives the power supply voltage through the switching circuit and executes various operating functions.

Recently, a power saving mode function, which shuts off the supply of the power supply voltage to an unused circuit block, is provided in the power control circuit to reduce power consumption, in consideration of the environment and a request for the power saving. On the other hand, detection and notification functions of the power saving mode, which detect the unused circuit block and inform the power control circuit, are provided in the operating circuit.

FIG. 5 is a block diagram of a conventional integrated circuit 200 having the power saving mode. The integrated circuit 200 includes a power supply 210 which supplies a power supply voltage Vd, an operating circuit 1 which executes various operating functions, a power control circuit 2 having a power saving mode function, and a transistor 30 as a switching circuit. The power supply voltage Vd is supplied to the power control circuit 2 and the switching circuit 30. A power supply voltage Vda is supplied to the operating circuit 1 through the switching circuit 30.

The operating circuit 1 may include, for example, a CPU (Central Processing Unit) 11. The CPU 11 detects a power saving mode of the operating circuit 1 by receiving a first signal which shows a transition from a normal active mode to the power saving mode, and outputs a notification signal PS to the power control circuit 2. The notification signal PS indicates that the supply of the power supply voltage Vd to the unused operating circuit 1 should be shut off.

The power control circuit 2 includes a controller 21, a counter 22 and an OR gate 23. The controller 21 shuts off the supply of a clock signal CL to the operating circuit 1, and then outputs a power control signal PC to the transistor 30 and also starts to output a reset signal RS to the operating circuit 1, in response to the notification signal PS. The transistor 30 shuts off the supply of the power supply voltage Vda in response to the power control signal PC. On the other hand, the controller 2 resumes the supply of the clock signal CL to the operating circuit 1, and stops outputting the power control signal PC to the transistor 30, in response to a release signal WU which indicates release of an interruption of the supply of the power supply voltage Vda. And, the controller 21 continues to output the reset signal RS during a reset delay period which is set in the counter 22.

The counter 22 counts the reset delay period and outputs the reset signal RS to the operating circuit 1 during the reset delay period when the power control circuit 2 releases the interruption of the supply of the power supply voltage Vda. The OR gate 23 controls a switching of the clock signal CL.

The integrated circuit 200 can initialize the operating circuit 1 due to input the reset signal RS into the operating circuit 1. Moreover, the integrated circuit 200 can inhibit a malfunction of the operating circuit 1 which results from a transient voltage of a rising period of the power supply 210, by continuing to output of the reset signal RS until the power supply 210 recovers to an active level and the power supply voltage Vda level settles.

FIGS. 6(a) thorough 6(e) are timing charts showing timing various signals in the conventional power saving integrated circuit 200. FIG. 6(a) is a waveform of the power supply voltage Vda which is supplied to the operating circuit 1 through the transistor 30. FIG. 6(b) is a signal waveform of the clock signal CL which is output from the OR gate 23. FIG. 6(c) is a signal waveform of the reset signal RS which is output from the counter 22. FIG. 6(d) is a signal waveform of the power control signal PC. FIG. 6(e) is a signal waveform of the release signal WU.

During a period TM1, when the CPU 11 detects the power saving mode, the CPU 11 outputs the notification signal PS to the controller 21. At this point, the controller 21 outputs a gate control signal GC to the OR gate 23 to stop the clock signal CL at a time t1. As a result, a period TM2 begins, which indicates a preparation period for shutting off the supply of the power supply voltage Vda to the operating circuit 1.

At a time t2, which indicates a termination of the period TM2, the controller 21 outputs the power control signal PC to the transistor 30 to shut off the supply of the power supply voltage Vda for the operating circuit 1. At the same time, the controller 21 starts to output the reset signal RS to the operating circuit 1 through the counter 22. As a result, a period TM3 begins, which indicates a period for shutting off the supply of the power supply voltage Vda to the operating circuit 1. After the start of the period TM3, the power supply voltage Vda level gradually falls due to an interruption of the supply of the power supply voltage Vda.

At a time t3, the controller 21 suspends the output of the power control signal PC to release the interruption of the supply of the power supply voltage Vda in accordance with the release signal WU, and outputs the gate control signal GC to the OR gate 23. At this time, the controller 21 sets a reset delay period Tw1 into the counter 22 so as to continue the output of the reset signal RS for the period Tw1. The counter 22 starts to count the reset delay period Tw1. As a result, a period TM4 begins, which indicates a recovery period until the termination of the reset signal RS.

During the period TM4, the power supply voltage Vda level gradually rises to the rated voltage level, and settles at a time t4. A rise time tv1 of the power supply voltage Vda fluctuates due to variable factors, for example the power voltage level of the integrated circuit 200 and the frequency of the clock signal CL. When the power voltage level of the integrated circuit 200 is greater, the integrated circuit 200 needs a longer the rise time tv1. And, when the frequency of the clock signal CL is greater, the integrated circuit also needs a longer rise time tv1. The rise time tv1 is set in accordance with the sum of an effective rise time ts1 and a fluctuation margin tm1 due to the variable factors. A reset period tr1 shows a period to reset the counter 22 after the power supply voltage Vda has settled.

The counter 22 is set such that a reset delay period tw1 is equal to the sum of rise time tv1 and the reset period tr1. The counter 22 continues to output the reset signal RS until a termination of the reset delay period tw1, and stops outputting the reset signal RS at a time t6 which indicates the termination of the reset delay period tw1. As a result, the operating circuit 1 recovers from the power saving mode to the normal active mode. A period TM5 indicates the recovered normal active mode of the implementing circuit 1 starts.

However, in the conventional power saving integrated circuit, it is necessary to set a relatively long reset delay period tw1, since the fluctuation margin tm1 is large due to the variable factors. The longer reset delay period tw1 requires the longer period TM4. The recovery of the integrated circuit 200 gets behind, since the controller can not stop outputting the reset signal RS during the period TM4, even though the power supply voltage Vda level reaches an active level. Therefore, the conventional power saving integrated circuit can not achieve a sufficient reduction in power consumption of the integrated circuit.

SUMMARY OF THE INVENTION

It is therefore an objective of the invention to provide a power saving integrated circuit, and an associated method of controlling the power saving integrated circuit, so as to achieve a reduction in power consumption of the integrated circuit by reducing the recovery period.

To achieve this object, in a power saving integrated circuit and a method of controlling the same, there is provided a power control circuit having a register which stores an operating condition signal of an implementing circuit, and sets a reset signal in accordance with the operating condition signal.

The present invention can shorten the recovery period from the release of the interception of the supply of the power supply voltage, until the termination of the reset signal. Therefore, the present invention can achieve a reduction in power consumption of the integrated circuit.

The above and further objects and novel features of the invention will become more fully apparent from the following detailed description, appended claims and accompanying drawings herein.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 6(a) through 6(e) are timing charts showing the timing of various signals in the conventional power saving integrated circuit.

DETAILED DESCRIPTION OF THE PREFERRED EMBODIMENTS

Preferred embodiments of the present invention will hereinafter be described in detail with reference to the accompanying drawings. The drawings used for this description typically illustrate major characteristic parts to facilitate understanding of the invention.

Figure 1:
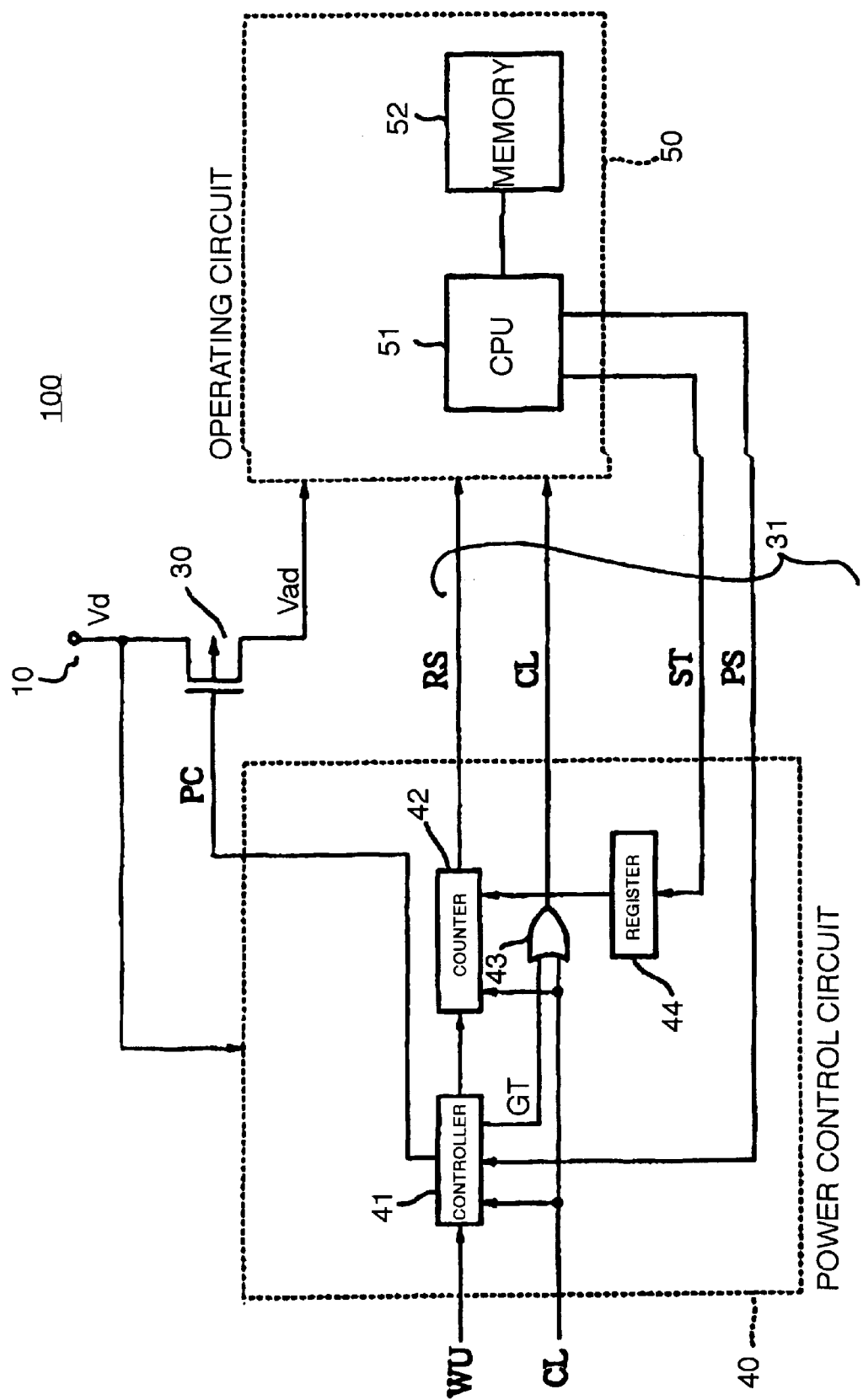
FIG. 1 is a block diagram of a power saving integrated circuit according to a first preferred embodiment of the present invention.

FIG. 1 is a block diagram of a power saving integrated circuit 100 according to a first preferred embodiment of the present invention. The integrated circuit 100 includes a power supply 10 which supplies a power supply voltage Vd, an operating circuit 50 which executes various operating functions, a power control circuit 40 having a power saving mode function, and a transistor 30 as a switching circuit. The power supply voltage Vd is supplied to the power control circuit 40 and the switching circuit 30. A power supply voltage Vda is supplied to the operating circuit 50 through the switching circuit 30.

The operating circuit 50 beneficially includes a CPU (Central Processing Unit) 51 and a memory 52 which stores an operating condition of the operating circuit 50. The CPU 51 detects a power saving mode of the operating circuit 50 by receiving a first signal which indicates a transition from a normal active mode to the power saving mode, and outputs a notification signal PS and an operating condition signal ST to the power control circuit 40. The notification signal PS indicates that the supply of the power supply voltage Vd to the unused operating circuit 50 should be shut off.

The operating condition signal ST is set in consideration of variable factors, for example an operating voltage level and a clock frequency of the operating circuit 50. For example, when the operating voltage level of the operating circuit 50 is greater, the operating condition signal ST indicates the need of a longer reset period for recovering the operating circuit 50. Specifically, the operating condition signal ST indicates a reset delay period, the reset delay period is equal to the sum of a shortest rise time of the power supply voltage Vda and a reset period to reset the counter 42 after the power supply voltage Vda has settled.

The power control circuit 40 includes a controller 41, a counter 42, an OR gate 43 and a register 44. The controller 41 shuts off the supply of a clock signal CL to the operating circuit 50, and then outputs a power control signal PC to the transistor 30 and also starts to output a reset signal RS to the operating circuit 50, in response to the notification signal PS. The controller 41 sets a reset delay period as a counter value into the counter in accordance with the operating condition signal ST which is stored in the register 44. The transistor 30 shuts off the supply of the power supply voltage Vda in response to the power control signal PC.

The controller 41 resumes the supply of the clock signal CL to the operating circuit 50 and stops to output the power control signal PC to the transistor 30, in response to a release signal WU which indicates release of an interruption of the supply of the power supply voltage Vda. The release signal WU indicates to release the power saving mode. The controller 41 continues to output the reset signal RS during the reset delay period which is set in the counter 42.

The counter 42 counts the reset delay period and outputs the reset signal RS to the operating circuit 50 during the reset delay period when the power control circuit 40 releases the interruption of the supply of the power supply voltage Vda. The OR gate 43 controls a switching of the clock signal CL.

The integrated circuit 100 can initialize the operating circuit 50 due to input the reset signal RS into the operating circuit 50. Moreover, the integrated circuit 100 can inhibit a malfunction of the operating circuit 50 which results from a transient voltage of a rising period of the power supply 10, by continuing to output of the reset signal RS until the power supply 10 recovers to an active level and the power supply voltage Vda level settles.

The operating circuit 50 and the power control circuit 40 are connected by a data bus 31. The CPU 51 recognizes the register 44 as a mapped register in a memory space. Therefore, the CPU 51 can write into the register 44 an optional value which is assigned by software, in accordance with a regular command, for example a "store" or a "write".

While the first preferred embodiment of the present invention presents an example in which the data bus 31 is adopted, the present invention is not limited to this example, and another connecting means may be adopted through which it is possible to assign a counter value and a dividing ratio, for example a regular connecting line.

Figure 2:
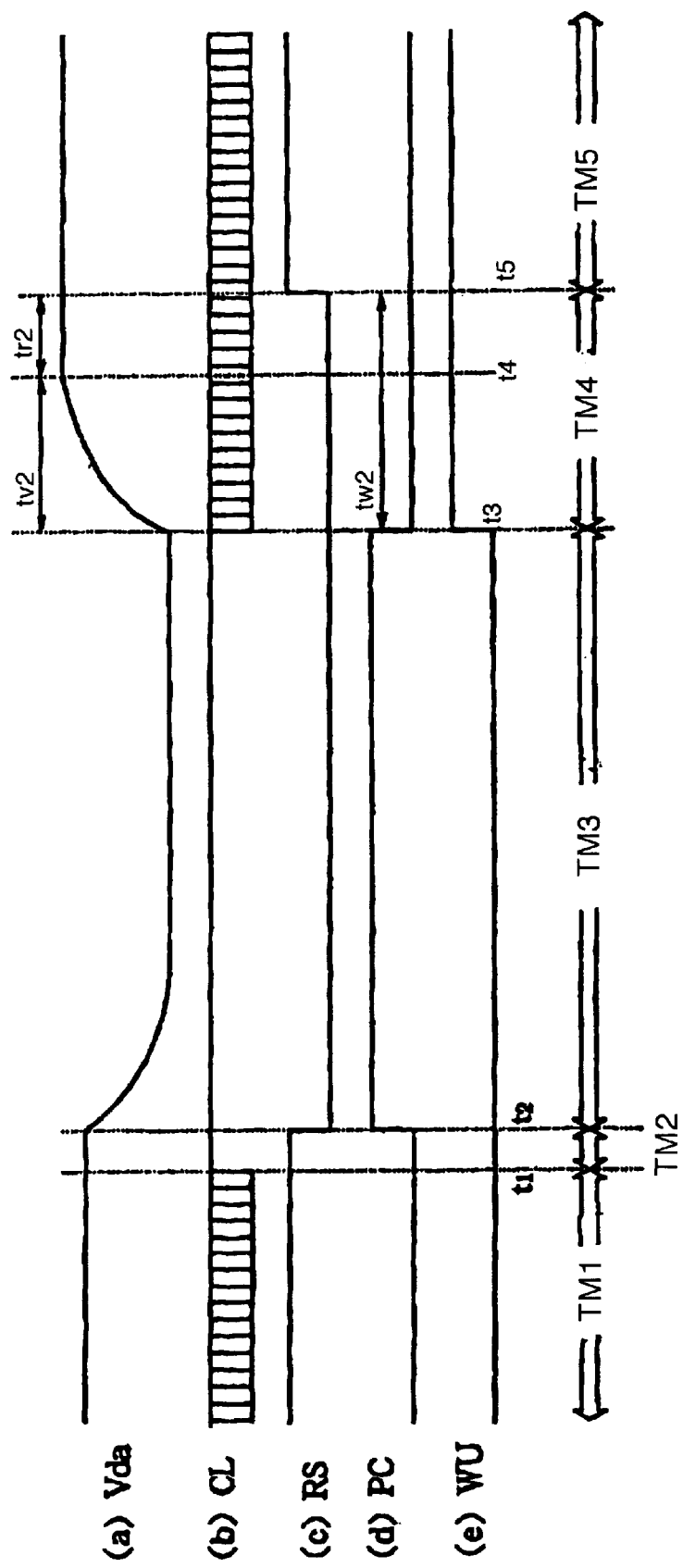
FIGS. 2(a) thorough 2(e) are timing charts showing timings of occurrence of various signals in the power saving integrated circuit according to the first preferred embodiment of the present invention.

FIGS. 2(a) thorough 2(e) are timing charts showing timing various signals in the power saving integrated circuit 100 according to the first preferred embodiment of the present invention. FIG. 2(a) is a waveform of the power supply voltage Vda which is supplied to the operating circuit 50 through the transistor 30. FIG. 2(b) is a signal waveform of the clock signal CL which is output from the OR gate 43. FIG. 2(c) is a signal waveform of the reset signal RS which is output from the counter 42. FIG. 2(d) is a signal waveform of the power control signal PC. FIG. 2(e) is a signal waveform of the release signal WU.

During a period TM1, the CPU 51 detects the first signal which indicates a transition from the normal active mode to the power saving mode, and then outputs the notification signal PS to the controller 41, and also outputs the operating condition signal ST to the register 44 at a time t1.

While in the first preferred embodiment, the CPU 51 outputs the operating condition signal ST to the register 44 after the CPU 51 detects the power saving mode, the CPU 51 may output the operating condition signal ST to the register 44 before the CPU 51 detects the power saving mode.

At this point, the controller 41 outputs a gate control signal GC to the OR gate 43 to stop the clock signal CL at the timing t1. As a result, a period TM2 begins, which indicates a preparation period for shutting off the supply of the power supply voltage Vda.

At a time t2 which indicates a termination of the period TM2, the controller 41 outputs the power control signal PC to the transistor 30 to shut off the supply of the power supply voltage Vda for the operating circuit 50. At the same time, the controller 41 starts to output the reset signal RS to the operating circuit 50 through the counter 42 which is set in accordance with the operating condition signal ST. As a result, a period TM3 begins, which indicates a period of shutting off the supply of the power supply voltage Vda. After the start of the period TM3, the power supply voltage Vda level gradually falls due to an interruption of the supply of the power supply voltage.

At a time t3, the controller 41 suspends the output of the power control signal PC to the transistor 30 to release the interruption of the supply of the power supply voltage Vda in accordance with the release signal WU, and outputs a gate control signal GC to the OR gate 43. At this time, the controller 41 sets a reset delay period tw2 as a counter value into the counter 42 in accordance with the operating condition signal ST in the register 44, so as to continue the output of the reset signal RS for the reset delay period tw2. The counter 42 starts to count the reset delay period tw2. As a result, a period TM4 begins, which indicates a recovery period until the termination of the reset signal RS.

A fluctuation margin of the power saving integrated circuit 100 is less than that of the conventional circuit and can ignored, since the reset delay period tw2 is exactly set in the counter 42 in accordance with the operating condition signal ST. Therefore, the period TM4 is shortened, since the reset delay period tw2 is shorter than that of the conventional circuit.

During the period TM4, the power supply voltage Vda level gradually rises to the rated voltage level and settles at a time t4. The rise time tv2 of the power supply voltage Vda fluctuates due to the variable factors, for example the operating voltage level of the operating circuit 50 and the frequency of clock signal CL. However, the rise time tv2 is set as the shortest period in accordance with the operating condition signal ST, considering the variable factors. A reset period tr2 indicates a period to reset the counter 42 after the power supply voltage Vda has settled.

The counter 42 is set such that the reset delay period tw2 is equal to the sum of the shortest rise time tv2 and the reset period tr2. The counter 42 continues to output the reset signal RS until a termination of the reset delay period tw2, and stops outputting the reset signal RS at a time t5 which indicates the termination of the reset delay period tw2. As a result, the operating circuit 50 recovers from the power saving mode to the normal active mode. A period TM5 begins, which indicates the recovered normal active mode of the implementing circuit 50.

According to the first preferred embodiment of the present invention, since the reset delay period tw2 is set in the counter 42 in accordance with the operating condition signal ST, considering the variable factors of the implementing circuit 50, the power control circuit 40 does not need to consider the fluctuation margin of those variable factors. Therefore, since the period TM4, which indicates the recovery period until the termination of the reset signal RS, is shortened, the first preferred embodiment can achieve a reduction in power consumption of the integrated circuit.

Recently, one of the power saving functions knows to control the power consumption due to a reduction in clock frequency, in addition to control "ON" and "OFF" switching of the supply of the power supply voltage. Next, such a power saving integrated circuit will be described.

Figure 3:
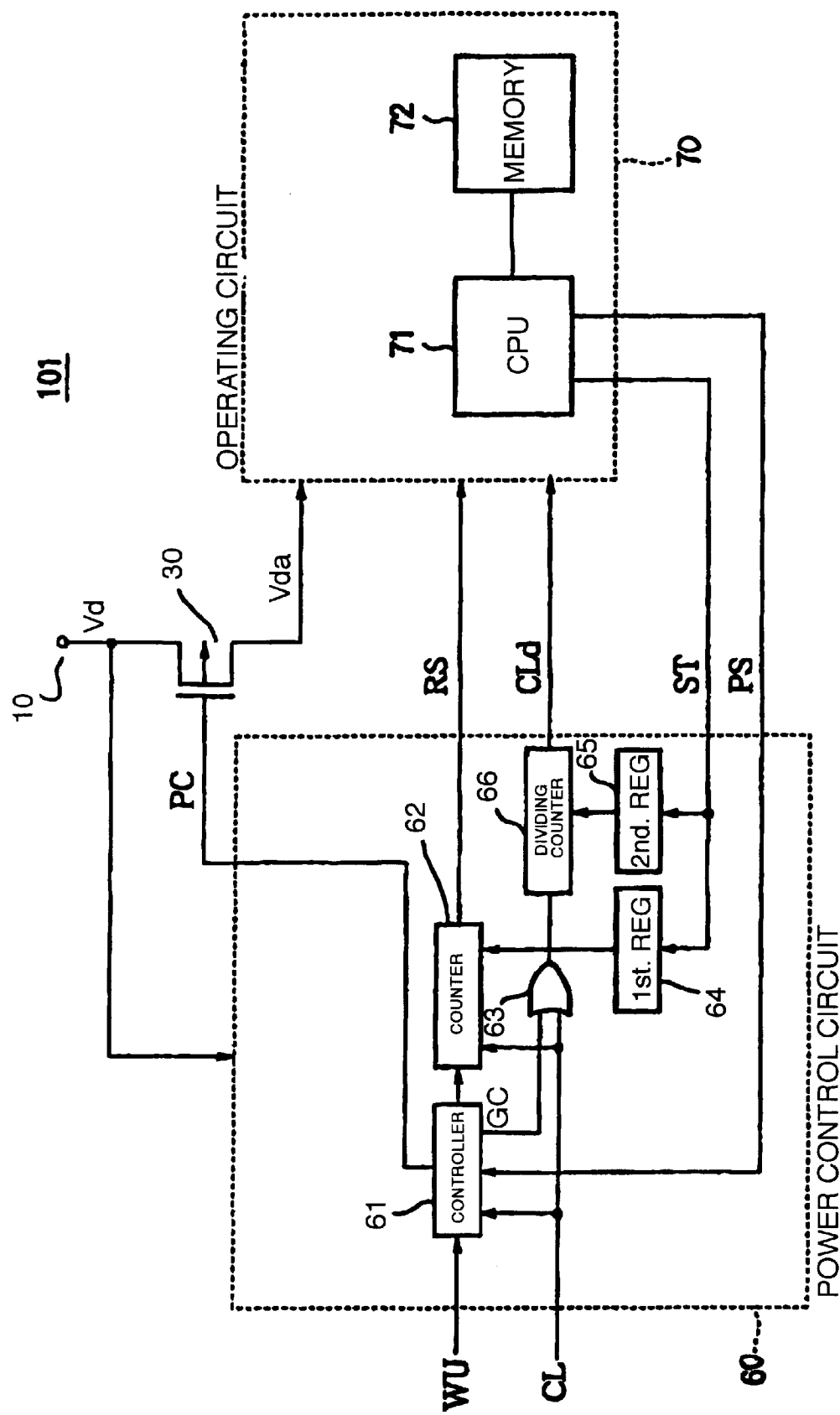
FIG. 3 is a block diagram of a power saving integrated circuit according to a second preferred embodiment of the present invention.

FIG. 3 is a block diagram of a power saving integrated circuit 101 according to a second preferred embodiment of the invention. The integrated circuit 101 includes a power supply 10 which supplies a power supply voltage Vd, an operating circuit 70 which executes various operating functions, a power control circuit 60 having a power saving mode function, and a transistor 30 as a switching circuit. The power supply voltage Vd is supplied to the power control circuit 60 and the switching circuit 30. A power supply voltage Vda is supplied to the operating circuit 70 through the switching circuit 30.

The operating circuit 70 beneficially includes a CPU (Central Processing Unit) 71 and a memory 72 which stores an operating condition of the operating circuit 70. The CPU 71 detects a power saving mode of the operating circuit 70 by receiving a first signal which indicates a transition from a normal active mode to the power saving mode, and outputs a notification signal PS and an operating condition signal ST to the power control circuit 60. The notification signal PS indicates that the supply of the power supply voltage Vd to the unused implementing circuit 70 should be shut off.

The operating condition signal ST is set in consideration of certain variable factors, for example an operating voltage level and a clock frequency of the implementing circuit 70. The operating condition signal ST includes two kinds of data, one data indicates a reset delay period which is set in accordance with the operating voltage level of the operating circuit 70, and the other data indicates a clock frequency which is in correlation with the reset delay period.

The power control circuit 60 includes a controller 61, a counter 62, an OR gate 63, first and second registers 64, 65, and a dividing counter 66. The controller 61 shuts off the supply of a clock signal CL to the operating circuit 70, and then outputs a power control signal PC to the transistor 30 and also starts to output a reset signal RS to the operating circuit 70, in response to the notification signal PS. The controller 61 sets a reset period as a counter value into the counter 62 in accordance with the operating condition signal ST (the data indicating the reset delay period) which is stored in the first register 64. The transistor 30 shuts off the supply of the power supply voltage Vda in response to the power control signal PC.

The controller 61 resumes the supply of the clock signal CL to the implementing circuit 70 and stops outputting the power control signal PC to the transistor 30, in response to a release signal WU which indicates to release an interruption of the supply of the power supply voltage Vda. The release signal WU indicates to release the power saving mode. The controller 61 continues to output the reset signal RS during the reset delay period which is set in the counter 62.

The counter 62 counts the reset delay period and outputs the reset signal RS to the operating circuit 70 during the reset delay period when the power control circuit 60 releases the interruption of the supply of the power supply voltage Vda. The OR gate 63 controls a switching of the clock signal CL.

The dividing counter 66 divides the clock signal CL and outputs a divided clock signal CLd to the implementing circuit 70 in accordance with the operating condition signal ST (the data of the clock frequency). The frequency of the divided clock signal CLd is less than that of the clock signal CL.

Next, an operation of the power saving integrated circuit 101 is described below.

During a period TM1, the CPU 71 detects the first signal which indicates a transition from the normal active mode to the power saving mode, and then outputs the notification signal PS to the controller 61 and also outputs the operating condition signal ST to the first and second registers 64, 65 at a time t1. The first register 64 stores the data of the reset delay period tw2. And, the second register 65 stores the data of the clock frequency which is correlation with the reset delay period tw2.

While in the second preferred embodiment, the CPU 71 outputs the operating condition signal ST to the first and second registers 64, 65 after the CPU 71 detects the power saving mode, the CPU 71 may output the operating condition signal ST to the first and second registers 64, 65 before the CPU 71 detects the power saving mode.

At this point, controller 61 outputs a gate control signal GC to the OR gate 63 to stop the clock signal CL at the timing t1. As a result, a period TM2 begins, which indicates a preparation period for shutting off the supply of the power supply voltage Vda.

At a time t2 which indicates a termination of the period TM2, the controller 61 outputs the power control signal PC to the transistor 30 to shut off the supply of the power supply voltage Vda for the operating circuit 70. At the same time, the controller 61 starts to output the reset signal RS to the operating circuit 70 through the counter 62 which is set in accordance with the operating condition signal ST. As a result, a period TM3 begins, which indicates a period of shutting off the supply of the power supply voltage Vda. After the start of the period TM3, the power supply voltage Vda level gradually falls due to an interruption of the supply of the power supply voltage.

At a time t3, the controller 61 suspends the output of the power control signal PC to the transistor 30 to release the interruption of the supply of the power supply voltage Vda in accordance with the release signal WU, and outputs a gate control signal GC to the OR gate 63. At this time, the controller 61 sets the reset delay period tw2 as a counter value into the counter 22 in accordance with the operating condition signal ST in the first register 64, so as to continue the output of the reset signal RS for the reset delay period tw2. The counter 62 starts to count the reset delay period tw2. As a result, a period TM4 begins, which indicates a recovering period until the termination of the reset signal RS.

A fluctuation margin of the power saving integrated circuit 101 is less than that of the conventional circuit and can be ignored, since the reset delay period tw2 is exactly set into the counter 42 in accordance with the operating condition signal ST. Therefore, the period TM4 is shortened, since the reset delay period tw2 is shorter than that of the conventional circuit.

During the period TM4, the power supply voltage Vda level gradually rises to the rated voltage level and settles at a time t4. A rise time tv2 of the power supply voltage Vda fluctuates due to the variable factors, for example the operating voltage level of the implementing circuit 70 and the frequency of the divided clock signal CLd. However, the rise time tv2 is set as the shortest period in accordance with the operating condition signal ST considering of the variable factors. A reset period tr2 indicates a period to reset the counter 42 after the power supply voltage Vda has settled. The counter 62 is set such that the reset delay period tw2 is equal to the sum of the shortest rise time tv2 and the reset period tr2. The counter 62 continues to output the reset signal RS until a termination of the reset delay period tw2, and stops outputting the reset signal RS at a time t5 which indicates the termination of the reset delay period tw2. As a result, the operating circuit 70 recovers from the power saving mode to the normal active mode. A period TM5 begins, which indicates the recovered normal active mode of the operating circuit 70.

According to the second preferred embodiment of the present invention, since the dividing counter 66 divides the clock signal CL and reduces the frequency of the clock signal CL, the rise time tv2 of the power supply voltage Vda, is reduced. Therefore, since the period TM4 of the second preferred embodiment, which indicates the recovery period until the termination of the reset signal RS, is shorter than in the first preferred embodiment, the second preferred embodiment can achieve a larger reduction in power consumption of the integrated circuit.

In the second preferred embodiment of the present invention, the power supply voltage Vda level and the settled power supply voltage level are a fixed voltage level. Specifically, the optimum value of the reset delay period tw2 and the clock frequency which is correlation with the reset delay period tw2 are set as the operating condition signal ST.

The correlation between the optimum value of the reset delay period tw2 and the clock frequency shows that the reset delay period tw2 of the integrated circuit 101 fluctuates in accordance with the maximum clock frequency. The integrated circuit 101 which has the lower clock frequency can operate when the reset delay period tw2 is shorter. However, when the clock frequency is greater, the integrated circuit 101 needs a longer reset delay period tw2 to operate.

That is, when the clock frequency is greater, the integrated circuit 101 needs a longer rise time tv2 thereby increasing the necessary reset delay period tw2. On other hand, since the rise time tv2 can be shortened when the clock frequency is lower, the reset delay period tw2 can be shortened.

While the second preferred embodiment of the present invention presents an example in which the power supply voltage Vda level is a fixed voltage level, the invention is not limited to this example, and the power supply voltage level Vda may be reduced in response to the clock frequency of the clock signal. Therefore, the integrated circuit 101 can achieve a larger reduction in power consumption.

Figure 4:
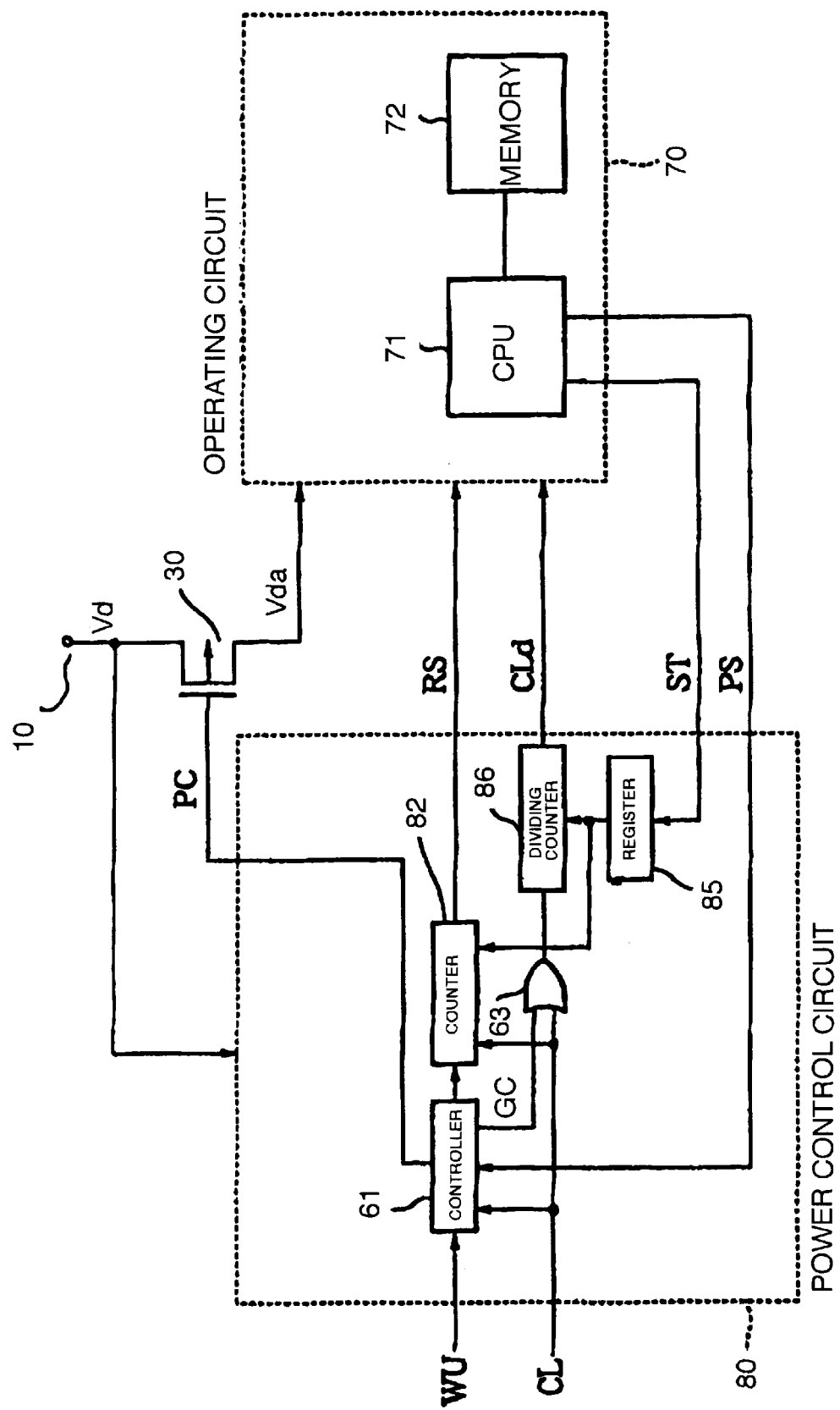
FIG. 4 a block diagram of a power saving integrated circuit according to a third preferred embodiment of the present invention.
Figure 5:
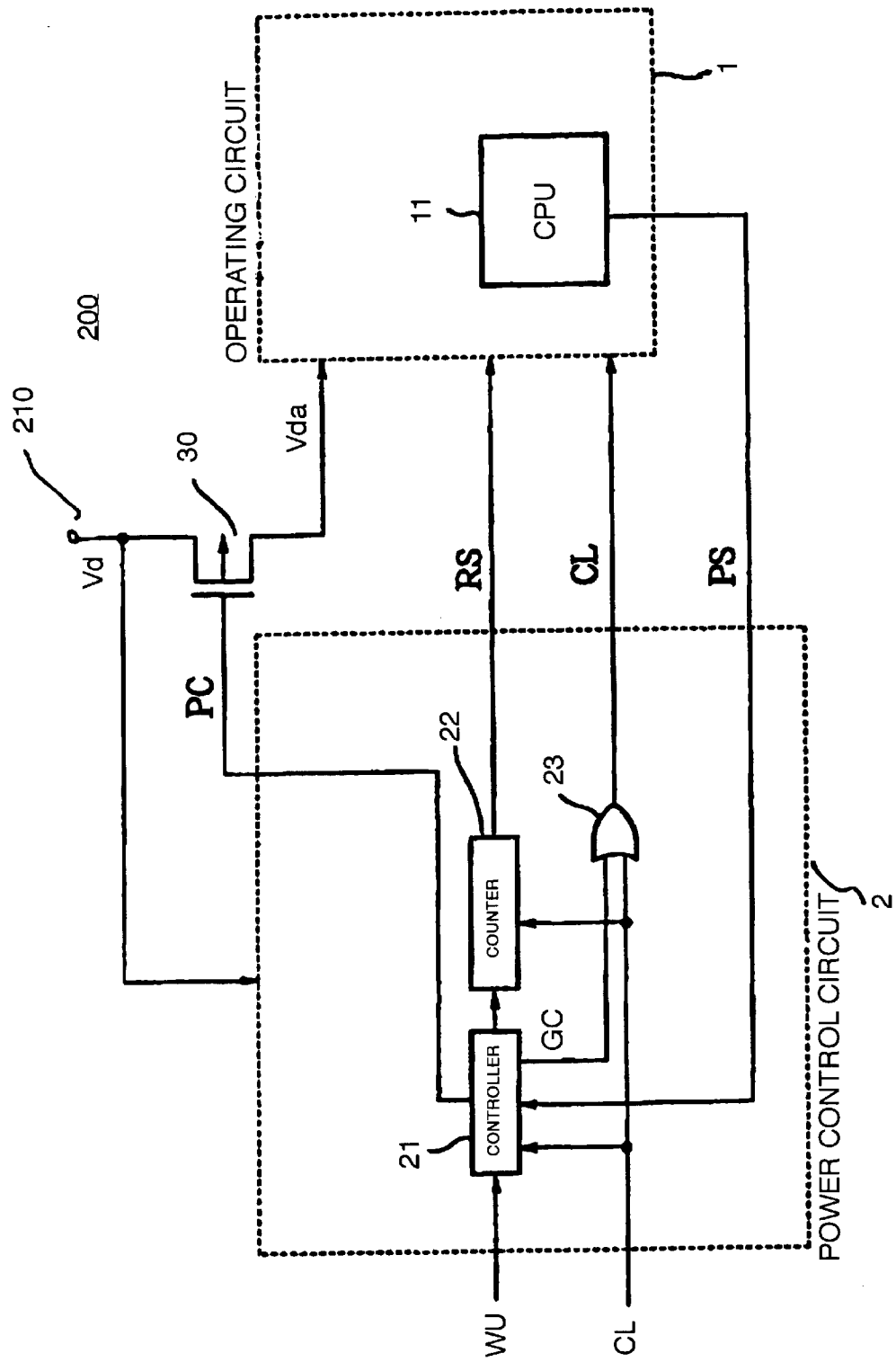
FIG. 5 is a block diagram of a conventional power saving integrated circuit.

FIG. 4 is a block diagram of a power saving integrated circuit 102 according to a third preferred embodiment of the invention. The integrated circuit 102 includes a power supply 10 which supplies a power supply voltage Vd, an operating circuit 70 which executes various operating functions, a power control circuit 80 having a power saving mode function, and a transistor 30 as a switching circuit.

In the third preferred embodiment, the power control circuit 80 has only one register 85 which stores an operation condition signal ST, in contrast to the second preferred embodiment which has the first and second registers 64, 65. The register 85 outputs the operating condition signal ST to the counter 82 and the dividing counter 86, respectively.

According to the third preferred embodiment of the present invention, since a writing period of the third preferred embodiment is shorter than for the second preferred embodiment, the period TM4, which indicates the recovery period until the termination of the reset signal RS, is shortened. Therefore, the third preferred embodiment can achieve a larger reduction in power consumption of the integrated circuit 102.

While the preferred embodiments of the present invention present examples in which the power control circuit and the operating circuit have a "one-to-one" relationship, the invention is not limited to this example and may be used to control a plurality of the operating circuits. The power control circuit can control the plurality of the operating circuits so as to set variable factors for the plurality of operating circuits, respectively.

As described above, the power saving integrated circuit and the method of controlling the same can shorten the recovery period from the release of the interruption of the supply of the power supply voltage until the termination of the reset signal. Therefore, the circuit and method of the present invention can achieve a reduction in power consumption of the integrated circuit.

The present invention has been described with reference to illustrative embodiments, however, this description must not be considered to be confined only to the embodiments illustrated. Various modifications and changes of these illustrative embodiments and the other embodiments of the present invention will become apparent to one skilled in the art from reference to the description of the present invention. It is therefore contemplated that the appended claims will cover any such modifications or embodiments as fall within the true scope of the invention.

What is claimed is:

1. A power saving integrated circuit having a power saving mode function, comprising:

a power supply which supplies a power supply voltage;

an operating circuit having a memory which stores an operating condition of the operating circuit, wherein a supply of the power supply voltage to the operating circuit is interrupted when the integrated circuit is in a power saving mode;

a switching circuit which switches the supply of the power supply voltage to the operating circuit; and a power control circuit having a first register which receives and stores an operating condition signal indicating the operation condition, and a counter that continues to output a reset signal during a reset delay period which is set in accordance with the operating condition signal.

2. The power saving integrated circuit according to claim 1, wherein the reset delay period is equal to a sum of a shortest rise time of the power supply voltage and a reset period to reset the counter after the power supply voltage has settled.

3. The power saving integrated circuit according to claim 1, wherein the counter continues to output the resist signal from a release of the interruption of the supply of the power supply voltage until a termination of the reset delay period.

4. The power saving integrated circuit according to claim 1, wherein the counter continues to output the reset signal from a release of the interruption of the supply of the power supply voltage until a level of the power supply voltage reaches an operating voltage level of the operating circuit.

5. The power saving integrated circuit according to claim 1, wherein the power saving circuit further comprises:

a dividing counter which divides a clock signal and outputs a divided clock signal to the operating circuit, in accordance with the operating condition signal which is stored in the first register.

6. The power saving integrated circuit according to claim 1, wherein the power control circuit further comprises:

a second register which receives and stores the operating condition signal; and a dividing counter which divides a clock signal and outputs a divided clock signal to the operating circuit, in accordance with the operating condition signal which is stored in the second register.

7. A power saving integrated circuit having a power saving mode function, comprising:

a power supply which supplies a power supply voltage;

an operating circuit having a memory which stores an operating condition of the operating circuit, wherein a supply of the power supply voltage to the operating circuit is interrupted when the integrated circuit is in a power saving mode, and wherein the operating condition includes a reset delay period which is set in accordance with an operating voltage level of the operating circuit and a clock frequency which is correlated with the reset delay period;

a switching circuit which switches the supply of the power supply voltage to the operating circuit;

a first register which receives and stores a signal indicative of the reset delay period;

a second register which receives and stores a signal indicative of the clock frequency;

a counter which continues to output a reset signal to the operating circuit in accordance with the reset delay period; and a dividing counter which divides a clock signal and outputs a divided clock signal to the operating circuit in accordance with the clock frequency.

8. The power saving integrated circuit according to claim 7, wherein the reset delay period is equal to a sum of a shortest rise time of the power supply voltage and a reset period to reset the counter after the power supply voltage has settled.

9. The power saving integrated circuit according to claim 7, wherein the counter continues to output the reset signal from a release of the interruption of the supply of the power supply voltage until a termination of the reset delay period.

10. The power saving integrated circuit according to claim 7, wherein the counter continues to output the reset signal from a release of the interruption of the supply of the power supply voltage until the power supply voltage level reaches the operating voltage level of the operating circuit.

11. A method of controlling a power saving integrated circuit having a normal active mode and a power saving mode, comprising:

detecting a first signal which shows a transition from the normal active mode to the power saving mode;

interrupting supply of a power supply voltage to an operating circuit in the integrated circuit responsive to said detecting a first signal;

storing an operating condition signal which indicates an operating condition of the operating circuit;

outputting a reset signal to the operating circuit in accordance with the stored operating condition signal;

starting a reset delay period in response to a release signal, which indicates release of the interruption of the supply of the power supply voltage, the reset delay period being set in accordance with the operating condition signal; and stopping the output of the reset signal after a termination of the reset delay period.

12. The method according to claim 11, wherein the output of the reset signal continues from a release of the interruption of the supply of the power supply voltage until the termination of the reset delay period.

13. The method according to claim 11, wherein the output of the reset signal continues from a release of the interruption of the supply of the power supply voltage until a level of the power supply voltage reaches an operating voltage level of the operating circuit.

14. The method according to claim 11, wherein the operation condition signal which indicates the operating condition is stored in a first register, the method further comprising:

dividing a clock signal and outputting a divided clock signal to the operating circuit, in accordance with an operating condition signal which indicates a clock frequency of the operating circuit and which is stored in the first register.

15. The method according to claim 11, wherein the operation condition signal which indicates the operating condition is stored in a first register, the method further comprising:

receiving and storing an operating condition signal which indicates a clock frequency of the operating circuit and which is stored in a second register; and dividing a clock signal and outputting a divided clock signal to the operating circuit, in accordance with the operating condition which is stored in the second register.

16. A method of controlling a power saving integrated circuit having a normal active mode and a power saving mode, comprising:

detecting a first signal which shows a transition from the normal active mode to the power saving mode;

interrupting supply of a power supply voltage to an operating circuit in the integrated circuit responsive to said detecting a first signal;

storing a reset delay period which is set in accordance with an operating voltage level of the operating circuit;

storing a clock frequency which is in correlation with the reset delay period;

outputting a reset signal to the operating circuit in accordance with the stored reset delay period;

dividing a clock signal and outputting a divided clock signal to the operating circuit in accordance with the stored clock frequency;

releasing the power saving mode in response to a release signal which indicates a time to release the interruption of the supply of the power supply voltage; and interrupting the output of the reset signal after a termination of the reset delay period.

17. The method according to claim 16, wherein the output of the reset signal continues from a release of the interruption of the supply of the power supply voltage until a termination of the reset delay period.

18. The method according to claim 16, wherein the output of the reset signal continues from a release of the interruption of the supply of the power supply voltage until a level of the power supply voltage reaches the operating voltage level of the operating circuit.

* * * * *